Figure 1:
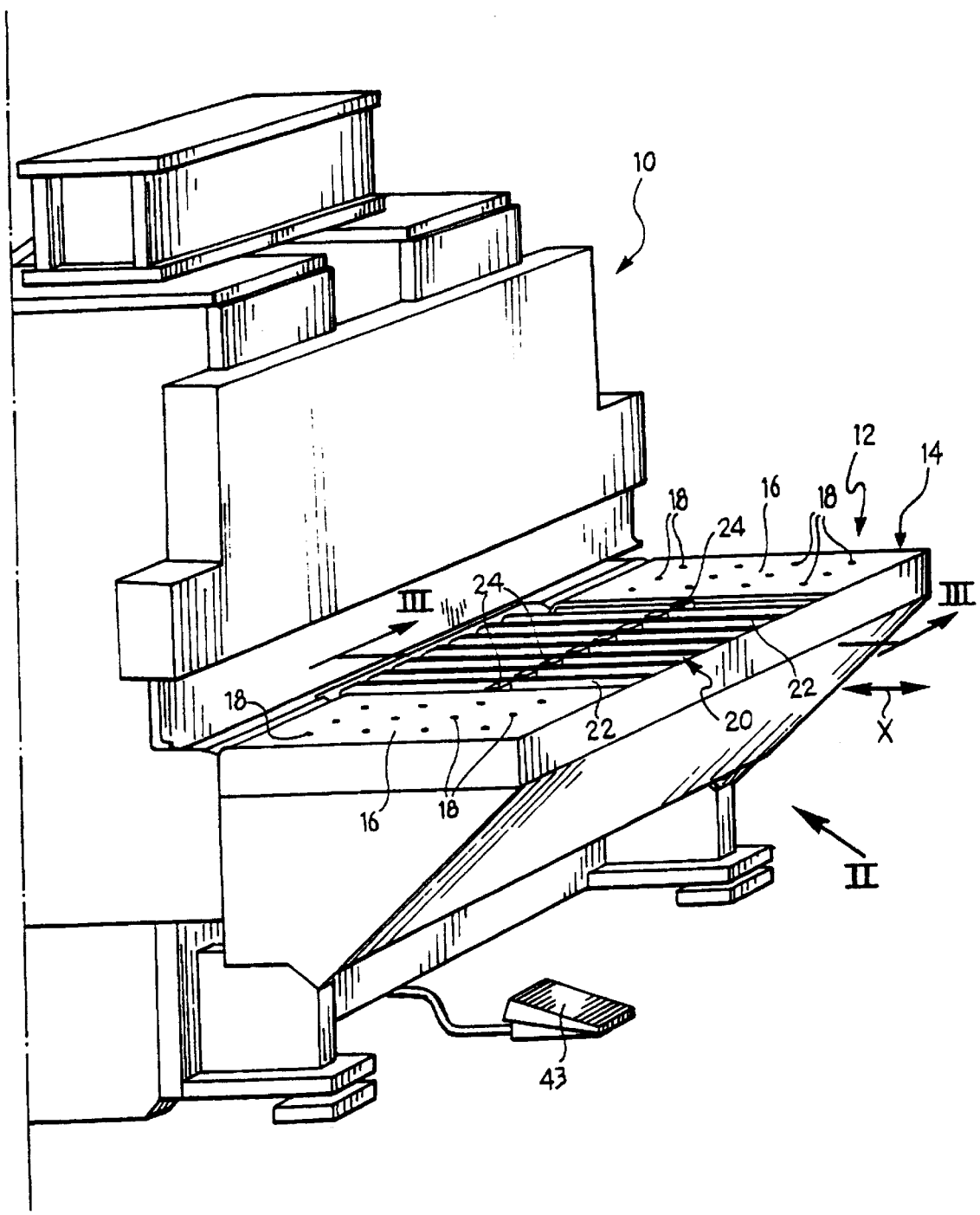

United States Patent
Codatto

[19]

[11] Patent Number: 5,964,568
[45] Date of Patent: Oct. 12, 1999

[54] DEVICE FOR GRIPPING AND HANDLING PIECES OF SHEET MATERIAL AND MANIPULATOR OF PIECES OF SHEET MATERIAL COMPRISING THIS DEVICE

[76] Inventor: Antonio Codatto, Via Venezia 21, I-36045 Lonigo, Italy

[21] Appl. No.: 08/836,306

[22] PCT Filed: Nov. 7, 1995

[86] PCT No.: PCT/EP95/04371

§ 371 Date: Jul. 11, 1997

§ 102(e) Date: Jul. 11, 1997

[87] PCT Pub. No.: WO96/14965

PCT Pub. Date: May 23, 1996

[30] Foreign Application Priority Data

Nov. 9, 1994 [IT] Italy .................................. T094A0885

[51] Int. Cl.[6] .................................................. B65G 37/00
[52] U.S. Cl. ...................... 414/752; 198/689.1; 198/721; 198/740; 72/405.1; 271/267; 294/65
[58] Field of Search .............................. 198/468.4, 689.1, 198/721, 740; 72/405.1; 271/194, 267; 294/64.1, 65; 414/14, 17, 225.01, 792

[56] References Cited

U.S. PATENT DOCUMENTS

| | | | |
|---|---|---|---|
| 3,990,570 | 11/1976 | Mercier et al. | 271/267 |
| 4,354,796 | 10/1982 | Bergman | 198/721 |
| 4,600,229 | 7/1986 | Oten . | |
| 5,207,553 | 5/1993 | Konagai | 294/65 |
| 5,879,040 | 3/1999 | Nagai et al. | 294/65 |

FOREIGN PATENT DOCUMENTS

| | | |
|---|---|---|
| A-0 298 056 | 1/1989 | European Pat. Off. . |
| A-0 585 508 | 3/1994 | European Pat. Off. . |
| A-0 607 901 | 7/1994 | European Pat. Off. . |
| A-35 00 342 | 7/1986 | Germany . |
| U-86 28 039 | 2/1987 | Germany . |
| U-87 03 223 | 4/1987 | Germany . |
| A-42 15 140 | 11/1993 | Germany . |

*Primary Examiner*—Jospeh E. Valenza
*Attorney, Agent, or Firm*—Blank Rome Comisky & McCauley LLP

[57] ABSTRACT

The device comprises a transfer unit with a block (44) containing wells (48) in which suckers (50) are located. The wells (48) comprise a border (72) made of a sealing and friction material. The peripheral wall (60) of the sucker (50) is flexible enough to permit axial movement of the lip (62) between an expanded position in which the lip (62) projects above the border (72) of the well (48) and a contracted position in which the lip (62) is coplanar with this border. The internal space of the sucker (50) and the internal space (70) of the well (48) around the sucker are both connected to a vacuum source by respective narrow channels (64,68) whose cross sections are approximately the same as each other. The size of the cross sections of the narrow channels (64,68) is such that there is negligible loss of vacuum inside the sucker (50) when a work piece is placed against the lip (62) but not against the border (72) of the well (48).

14 Claims, 5 Drawing Sheets

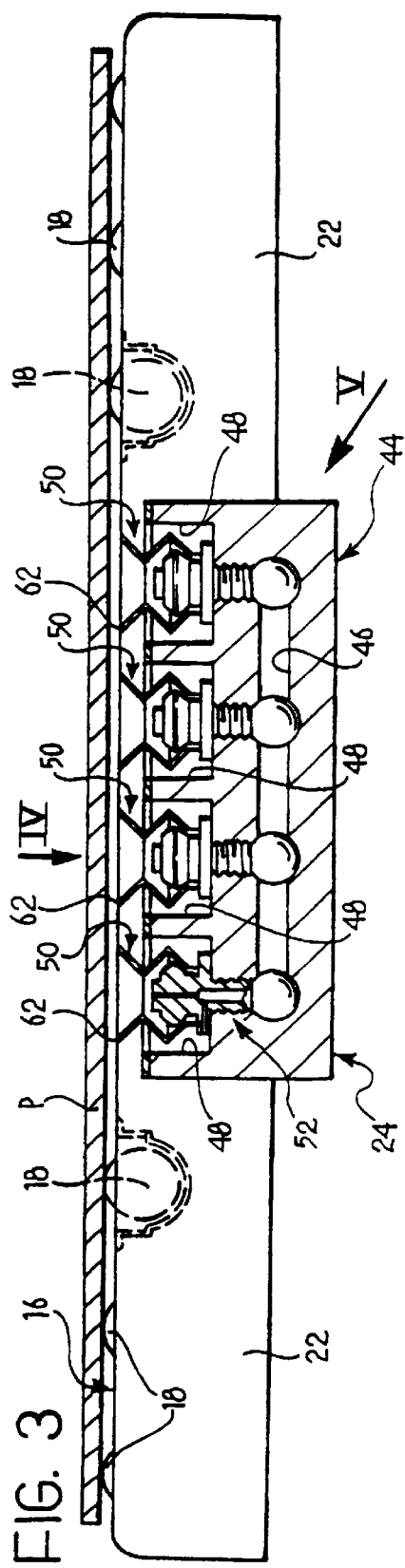
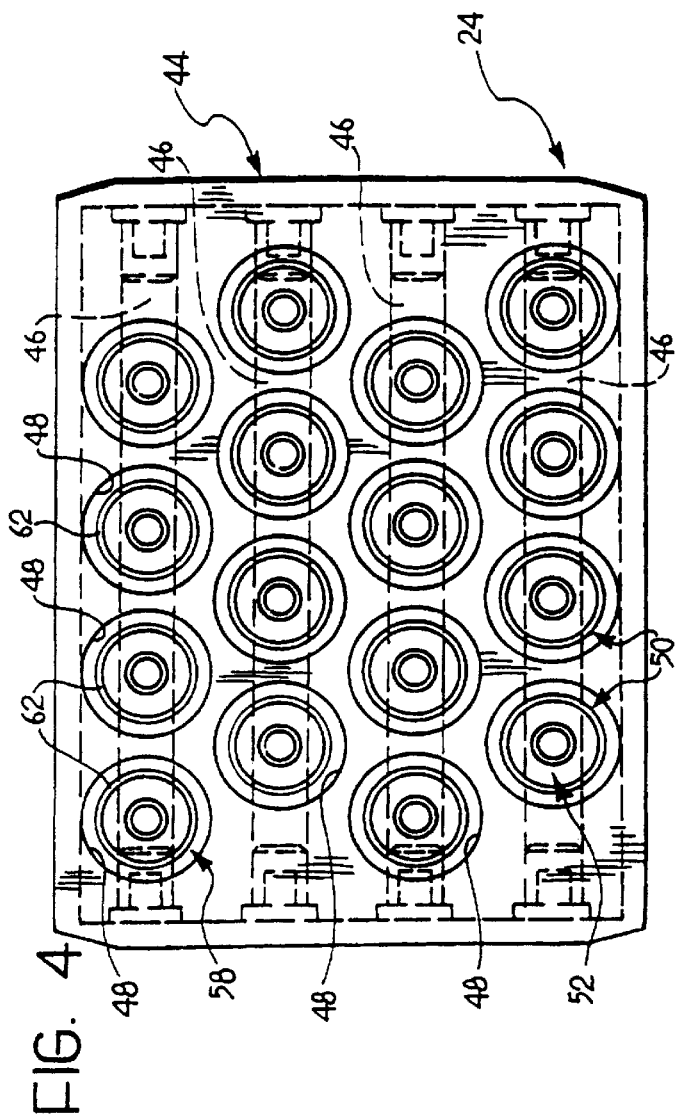

DEVICE FOR GRIPPING AND HANDLING PIECES OF SHEET MATERIAL AND MANIPULATOR OF PIECES OF SHEET MATERIAL COMPRISING THIS DEVICE

The present invention relates to a device for gripping and handling pieces of sheet material, of the kind comprising a transfer unit that can be moved towards and away from a face of the work piece and can also be moved along a path which the work piece is to follow, and that carries at least one sucker having a flexible peripheral wall with a peripheral lip intended to be placed against a face of the work piece and whose interior is connected to a vacuum source.

A great many such devices are already known and are used in industry for loading and unloading work pieces to and from a work station or for transferring work pieces between successive work stations.

Known devices used for gripping and handling pieces of sheet material include those disclosed and illustrated in documents DE-A-35 00 342 and EP-A-0 585 508.

Gripping and handling devices, especially those designed for use with stock in sheet form, such as sheet metal pieces or panels, are very useful for transferring the work pieces from one point to another provided positioning does not have to be too accurate, for unfortunately the very flexibility of suckers makes them prone to sideways movements, so that it is impossible to position the work pieces with any great accuracy. Situations where this is relevant include, for example, the need for accurate positioning of sheet metal or other kinds of sheet material in relation to a machine tool in order to carry out bending, shearing, punching and other such operations.

It is for this reason that sucker-type gripping and handling devices are not used to manipulate work pieces requiring to be positioned with extreme accuracy.

Another reason why the use of prior art gripping and handling devices is precluded in manipulating operations requiring accuracy of positioning is the fact that the peripheral lips of the suckers, which are made of rubber or similar elastomeric materials for flexibility, are subject sooner or later to wear making the vacuum grip on the work piece unreliable, with the consequence at the very least of the work piece shifting relative to the suckers and, in the worst case, complete failure to grip the work piece.

The invention has been developed in its application to manipulators on numerically controlled sheet metal bending presses, but is not limited to this application.

Presses of this kind are programmed to make a series of accurately positioned bends in a sheet metal panel which can be achieved by numerical control not only of the press but also of the manipulator. The same problem exists for example in shearing and punching presses operating not only on sheet metal but also on cardboard.

Hitherto, in order to guarantee the extreme accuracy of positioning of the work piece relative to the press or other machine tool, use has been made of manipulators having mechanical grippers that grip the sheet metal work piece on both faces, but this leads to problems of size and complexity of construction.

In order to obtain a firm grip on the work piece on only one face, attempts have also been made to use manipulators in which the gripping member consists of a magnetic plate, but with poor results.

The object of the present invention is to provide a device for gripping and handling pieces of sheet material, of the type outlined earlier, which uses suckers and makes it possible to achieve an extremely firm and accurate grip on the work piece and in which the wear to which the sucker lips are subject is of negligible influence and in any case takes a very long time to develop.

According to the present invention, this object is achieved by means of a device characterized in that the transfer unit comprises, for the sucker or for each sucker, a well in which the sucker is located centrally, in that the well or each well comprises a border, made of a sealing and friction material and concentric with the lip of the sucker, in that the peripheral wall of the sucker is flexible enough to permit axial movement of the lip between an expanded position in which the lip projects above the border of the well and a contracted position in which the lip is coplanar with this border, in that the internal space of the sucker and the internal space of the well around the sucker are both connected to the vacuum source by respective narrow channels whose cross sections are approximately the same as each other, and in that the size of the cross sections of the narrow channels is such that there is negligible loss of vacuum inside the sucker when the work piece is placed against the lip of the sucker but not against the border of the well.

A gripping and handling device constructed on these lines has the ability to operate as follows:

once the sucker and its well are connected up to the vacuum source, the transfer unit is brought towards the surface of the work piece of sheet material until the lip of the sucker is in contact with this surface. The sucker now clings to the work piece, and between the sucker and the work piece an initial grip is formed. This grip is comparatively strong because, owing to the dimensions of the vacuum channels, the loss of vacuum in the open well around the sucker is negligible;

once the initial grip has been formed, the transfer unit is brought towards the surface of the work piece until the border of sealing and friction material is placed against this surface. The well space around the sucker is now also closed hermetically and, owing to the fact that the cross section of the well is greater than that of the sucker, the force of retention applied by the same vacuum to the work piece is increased. At the same time, owing to the fact that the degree of vacuum inside and outside the sucker is the same, the lip of the sucker is no longer under stress and is not significantly subject to wear. With the surface of the work piece pressed against the sealing and friction material of the well border, the work piece cannot slip or slide relative to the block and hence accuracy of positioning is guaranteed.

The invention also relates to a manipulator of pieces of sheet material comprising the claimed gripping and handling device.

Figure 2:
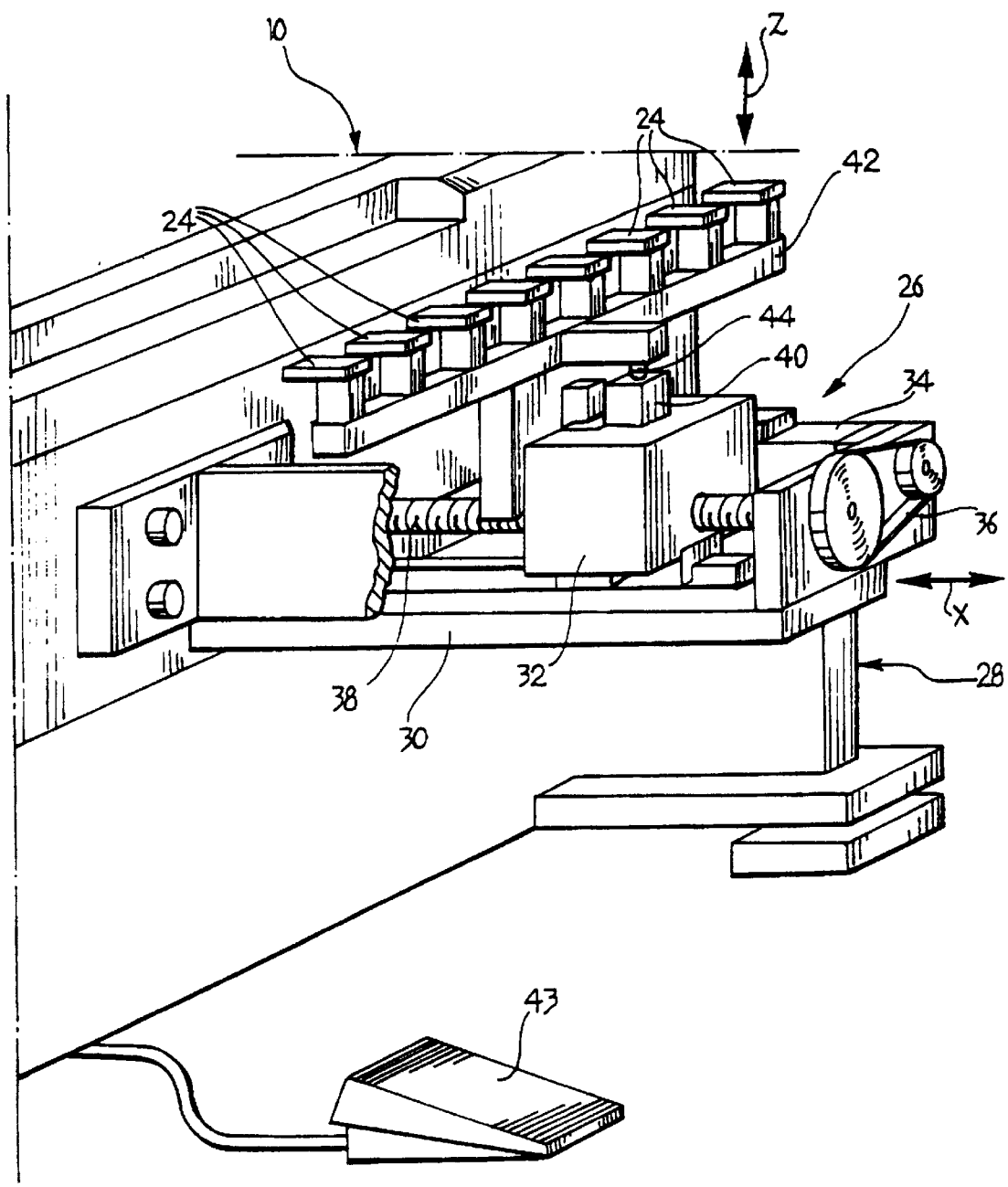
Figure 5:
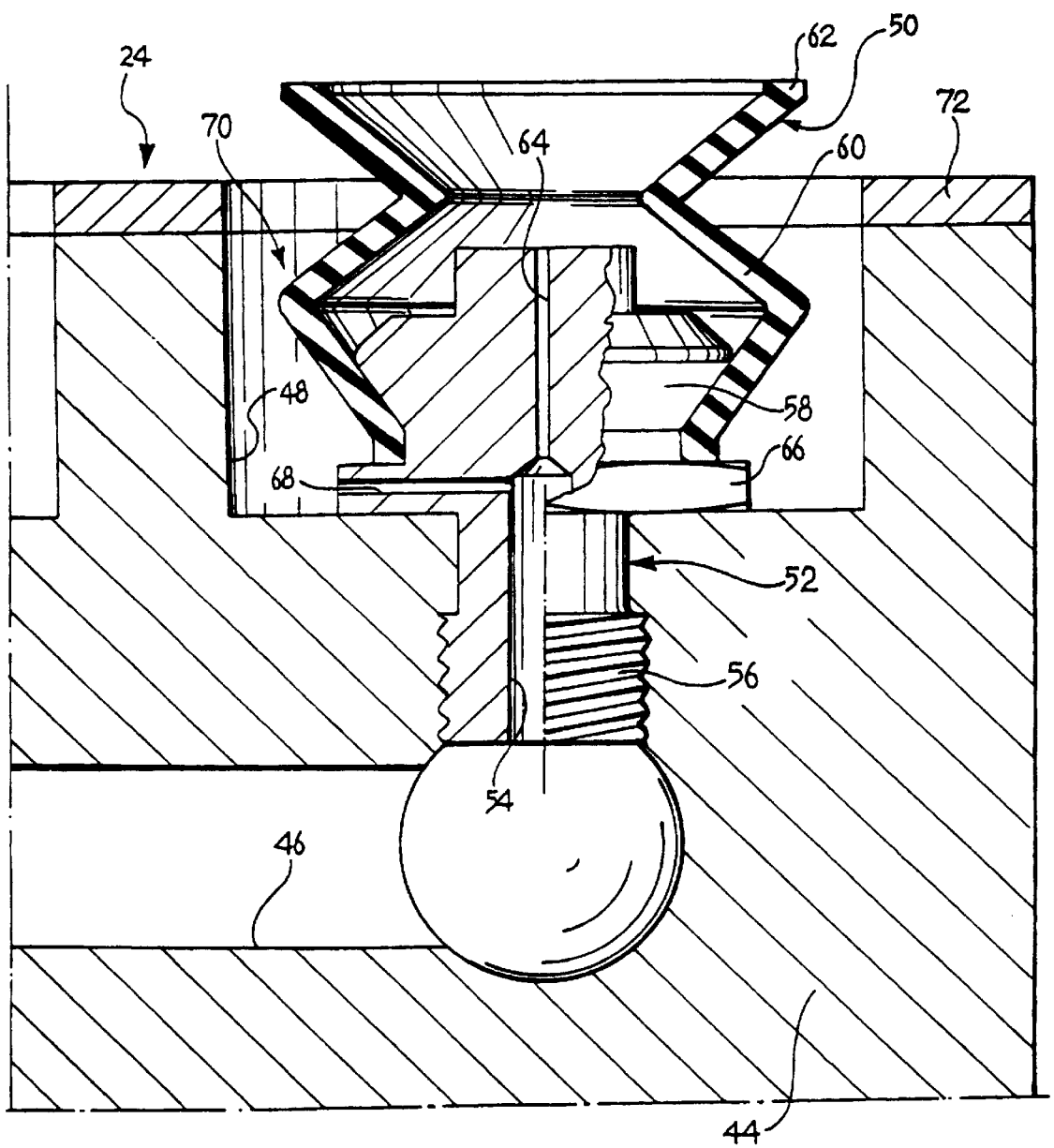
Figure 6:
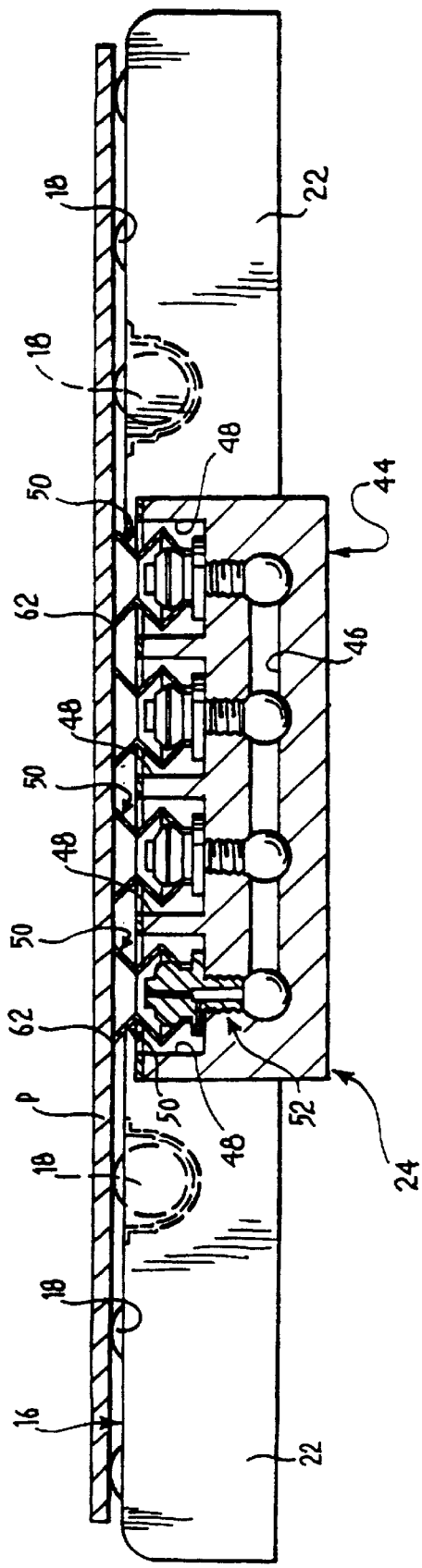
Figure 7:
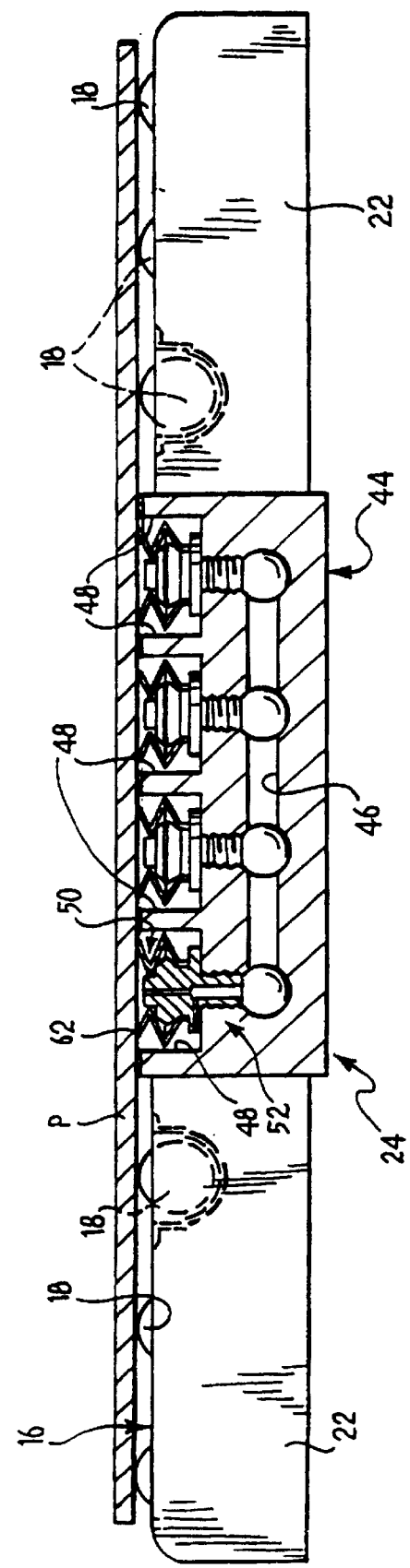

A clearer understanding of the invention will be obtained from a reading of the following detailed description, which refers to the accompanying drawings provided by way of a non-restricting example, in which:

FIG. 1 is a perspective view showing part of a sheet metal bending press with a feed table incorporating a multiple device for gripping and handling sheet metal pieces or panels to be folded in the press, FIG. 2 is a similar perspective view, on a larger scale, which illustrates the components located inside the feed table and forming the manipulator, FIG. 3 is a vertical section through the table and through a gripping and handling device in the plane marked III—III in FIG. 1, in which the gripping and handling device is in an initial state, FIG. 4 is a plan view from above, executed in the direction of arrow TV indicated in FIG. 3, of the gripping and handling device, FIG. 5 is a partial section on a larger scale of a detail of FIG. 3, and FIGS. 6 and 7 are cross sections similar to that in FIG. 3 and illustrating the gripping and handling device in two successive working states different from its state in FIG. 3.

Referring to FIG. 1, the numeral 10 indicates a sheet metal bending press as a whole. The press may for example be of the kind disclosed and illustrated in document EP-A-0 298 056.

At the front of the press 10 in a feed table indicated 12 as a whole.

The feed table 12 incorporates a manipulator which will be described later with reference to FIG. 2. For the present it need only be observed that the manipulator includes a supporting surface 14 that forms part of the table 12 and is intended to hold sheet metal pieces or panels on which the press 10 will execute a number of bends.

The supporting surface 14 comprises two static lateral parts 16 fitted with rolling balls 18 of a known kind to facilitate the sliding of the sheet metal pieces.

Within the perimeter of the supporting surface 14 and in between its two static parts 16 is a discontinuity or gap 20 that contains a grating-like structure of parallel bars 22 which also support the sheet metal pieces.

The bars 22 are orientated in the direction shown by the double arrow X, which is the direction in which the work piece is fed to the punches and dies of the press 10.

In the spaces between the bars 22 is a series of transfer units 24 able to move back and forth in the X directions and belonging to a manipulator which will now be described with reference to FIG. 2.

Referring to FIG. 2, inside the table 12 of FIG. 1 is a manipulator indicated as a whole by 26.

The manipulator 26 comprises a sturdy frame 28 mounted on the frame of the press 10. The frame 28 includes among other things a strong horizontal guide beam 30 along which a saddle 32 travels in the directions indicated by the double arrow X.

The movements of the saddle 32 are brought about by a numerical-control motor 34 acting through a toothed belt drive 36 and a traversing screw 38 which engages with a nut (not shown) incorporated in the saddle 32.

Also incorporated in the saddle 32 is a hydraulic or pneumatic linear actuator or cylinder 40, the axis of which is vertical.

A cross member 42, parallel with the front of the press 10, moves vertically on the saddle 32 in the directions of the double arrow Z and is supported by the rod 44 of the cylinder 40 to bring about the up and down movements of the cross member.

The cross member 42 in turn carries the series of transfer units 24.

A numerical-control apparatus, not shown, is set up so as to bring about, according to a previously determined program, the movements of the punches and dies of the press 10 and also, through the motor 34, the advancing and retreating movements indicated by the double arrow X of the transfer units 24 in the spaces between the bars 22 shown in FIG. 1.

In other embodiments, not illustrated, the transfer blocks could be mobile in other directions, for example using Cartesian coordinates to execute sideways transferring movements of the work piece as well.

Before commencing a bending cycle, the press operator first lays the sheet metal piece or panel on the supporting surface 14 in a reference or "zero" position determined by stops (not illustrated). This "zero" position is recorded by the numerical-control apparatus.

In FIGS. 1 and 2 the numeral 43 denotes a pedal for starting a cycle of bending a sheet metal piece or panel laid on the supporting surface 14.

With the work piece or panel in the "zero" position, the press operator depresses the pedal 43 in order to commence the bending cycle. This operation firstly causes the cross member 42 and its transfer units 24 to rise until they are placed against the lower face of the panel, as will be explained in more detail later with reference to the subsequent figures.

Once the transfer units 24 have been placed against the sheet metal panel, the numerical-control apparatus automatically initiates a cycle, the transfer units 24 introduce the sheet metal panel into the press 10 to the desired depth for the first bend, and the press 10 executes this bend. The cycle then continues automatically by carrying out all the subsequent parallel bends required, after which the transfer units 24 are retracted until the bent panel is out of the press 10.

Reference will now be made to FIGS. 3 and 4 in order to describe the structure of one of the gripping and handling devices in which the unit is marked 34.

FIG. 3 also shows at 22 one of the bars of the supporting surface 14, the balls of which are also shown at 18. P is a sheet metal panel or work piece which, at the start of the cycle, rests on the balls 18.

The transfer unit 24 preferably comprises a generally prismatic block 44 made of a light alloy or other metal.

The block 44 contains manifold channels 46 which are connected to a vacuum source, not illustrated.

Sunk into the top of the block 44 is an array of cylindrical wells 48 open on the top. Located concentrically in each of these wells is a sucker 50 whose top end is likewise open.

The structure of the sucker 50 and of the parts associated with it is shown in more detail in FIG. 5, to which reference will now be made.

Referring to FIG. 5, the manifold channel 46 leads to a nozzle 52 with an axial communicating channel 54 of comparatively large cross section.

The nozzle 52 comprises a threaded lower end 56 by which it is mounted in the block 44 and an upper core 58 that tapers in two directions.

The sucker 50, which is of rubber or the like, comprises a flexible peripheral wall G0. Preferably, as shown, the wall 60 is concertina-shaped to facilitate its axial contraction and expansion.

62 denotes a peripheral lip of the sucker 50, which defines its gripping mouth.

The lower part of the wall 60 fits securely around the core 58 of the nozzle 52.

The channel 54 of the nozzle 52 continues upwards with a narrow axial channel 64 leading into the interior of the sucker 50.

Between its lower end 56 and its core 58, the nozzle 52 has a collar 66 applied against the bottom of the well 48 and containing a narrow radial channel 68. The narrow channel 68 gives communication between the communicating channel 54 and the internal space of the well 48 around the sucker 50. This space is marked 70.

The dimensions of the narrow channels 64 and 68 will be discussed below.

The block 44 of the transfer unit 24 has a flat upper face into which the wells 48 are sunk and to which a coating 72 of a sealing and friction material is applied to form a border for each well 48 concentrically about the sucker 50.

The coating 72 is preferably an elastomeric material bonded to the metal block 34 by vulcanization.

As an indication, the thickness of the coating 72 is a few tenths of a millimeter (e.g. 0.6 mm), so that the coating can fully develop its characteristics as both a sealing and a friction material without becoming significantly compressed.

The working of the transfer unit 24 will now be described with reference to FIGS. 3, 6 and 7.

Initially, as illustrated in FIG. 3, when the work piece or panel P that is to be bent has been laid on the supporting surface 14 and is resting on the balls 18, the transfer unit 24 is in a lowered position in which the suckers 50 are in an expanded state in which their lips 62 project above the borders 72 of the wells 48 but do not touch the underside of the panel P.

In order to commence the manipulating of the panel P, and assuming that the vacuum source is already connected up to the manifold channels 46 of all the transfer units 24, the operator depresses the pedal 43 to commence the bending cycle.

The pressure on the pedal 43 causes the cylinder 40 shown in FIG. 2 to begin to raise the transfer units 24 bringing them firstly into the position illustrated in FIG. 6 in which the lips 62 of the suckers 50 are brought up against the panel P, which is still resting on the balls 18. Because of the vacuum created inside the suckers 50, the latter cling to the panel P and thus prevent it from sliding over the supporting surface 14.

The transfer units 24 then continue to rise into the position illustrated in FIG. 7. In the course of this movement the suckers 50 come into a contracted state in which their lips 62 are coplanar with the borders of the wells 48.

In the position of FIG. 7 the panel P rests on the coating 72 of the borders of the wells 48. This hermetically seals the wells 48 and a vacuum is therefore created inside them.

In this way the vacuum created inside the wells 48 anchors the panel P rigidly to all the transfer units 24, which can then move it accurately, under the numerical control, forwards and backwards as indicated by the double arrow X in FIGS. 1 and 2.

It will be appreciated that the suckers 50, which in their expanded position as shown in FIG. 7 are exerting all of the grip on the panel P, are no longer under stress when contracted in the position of FIG. 8 since the same depression is present both inside them and in the space 70 around them.

Returning to the narrow channels 64 and 68, their cross sections are approximately the same as each other and of a size such that there is negligible loss of vacuum inside each sucker 50 when the work piece P is placed against its lip 62 but not against the border 72 of the well.

The channels 64 and 68 are preferably no more than 1 mm in diameter and still more preferably about 0.25 mm in diameter, thus being as it were capillary channels.

I claim:

1. Device for gripping and handling pieces (P) of sheet material, of the kind comprising a transfer unit (24) that can be moved towards and away from a face of the work piece (P) and can also be moved along a path which the work piece (P) is to follow, and that carries at least one sucker (50) having a flexible peripheral wall (60) with a peripheral lip (62) intended to be placed against a face of the work piece (P) and whose interior is connected to a vacuum source, the device being characterized in that the transfer unit (24) comprises, for the sucker or for each sucker (50), a well (48) in which the sucker (50) is located centrally, in that the well or each well (4B) comprises a border (72), made of a sealing and friction material and concentric with the lip (62) of the sucker (50), in that the peripheral wall (60) of the sucker (50) is flexible enough to permit axial movement of the lip (62) between an expanded position in which the lip (62) projects beyond the border (72) of the well (48) and a contracted position in which the lip (62) is coplanar with this border, in that the internal space of the sucker (50) and the internal space (70) of the well (48) around the sucker (50) are both connected to the vacuum source by respective narrow channels (64, 68) whose cross sections are approximately the same as each other, and in that the size of the cross sections of the narrow channels (64, 68) is such that there is negligible lose of vacuum inside the sucker (50) when the work piece (P) is placed against the lip (62) of the sucker (50) but not against the border (72) of the well (48).

2. Device according to claim 1, characterized in that the narrow channels (64, 68) connecting the sucker (50) and the well (48) to the vacuum source are no more than 1 mm in diameter.

3. Device according to claim 2, characterized in that the diameter of the narrow channels (64, 68) is approximately 0.25 mm.

4. Device according to claim 1, characterized in that the peripheral wall (60) of the sucker (50) is concertina-shaped.

5. Device according to claim 1, characterized in that the transfer unit (24) comprises a block (44) containing the well or each well (48) and the border of the well or of each well (48) consists of a coating of elastomeric material (72) applied to a flat face of the block (44) into which the well or each well (48) is sunk.

6. Device according to claim 5, characterized in that the block (44) of the transfer unit (24) is of metal and the coating (72) of elastomeric material is bonded to the unit by vulcanization.

7. Manipulator for work pieces (P) of sheet material, characterized in that it comprises at least one gripping and handling device with one or more transfer units (24) according to any one of the previous claims, as well as a surface (14) for supporting the work piece (P) having within its perimeter at least one discontinuity (20) in which is situated at least one of these transfer units (24), in that the or each transfer unit (24) is mobile both in at least one direction (X) parallel with the supporting surface (14) and in a direction (Z) perpendicular to the supporting surface (14) between a retracted position in which the lip (62) of the sucker or of each sucker (50) is below the supporting surface (14) and an advanced position in which the sealing and friction border (72) of the well or of each well (48) projects above the supporting surface (14), in that it comprises, or is linked to, a vacuum source which is connected or selectively connectable to the sucker or each sucker (50) and to the well or each well (48), and in that it also comprises means (34, 40) for imparting to the or each transfer unit (24) the movements in the directions (X, Z) parallel and perpendicular to the supporting surface (14).

8. Device according to claim 1, characterized in that the peripheral wall (60) of the sucker (50) is concertina-shaped.

9. Device according to claim 2, characterized in that the peripheral wall (60) of the sucker (50) is concertina-shaped.

10. Device according to claim 3, characterized in that the peripheral wall (60) of the sucker (50) is concertina-shaped.

11. Device according claim 1, characterized in that the transfer unit (24) comprises a block (44) containing the well or each well (48) and the border of the well or of each well (48) consists of a coating of elastomeric material (72) applied to a flat face of the block (44) into which the well or each well (48) is sunk.

12. Device according claim 2, characterized in that the transfer unit (24) comprises a block (44) containing the well or each well (48) and the border of the well or of each well (48) consists of a coating of elastomeric material (72) applied to a flat face of the block (44) into which the well or each well (48) is sunk.

13. Device according claim 3, characterized in that the transfer unit (24) comprises a block (44) containing the well or each well (48) and the border of the well or of each well (48) consists of a coating of elastomeric material (72) applied to a flat face of the block (44) into which the well or each well (48) is sunk.

14. Device according claim 4, characterized in that the transfer unit (24) comprises a block (44) containing the well or each well (48) and the border of the well or of each well (48) consists of a coating of elastomeric material (72) applied to a flat face of the block (44) into which the well or each well (48) is sunk.

\* \* \* \* \*